United States Patent
Katz

(10) Patent No.: US 7,231,182 B2
(45) Date of Patent: Jun. 12, 2007

(54) TRACKING NETWORK PROBLEMS IN A WIRELESS TELECOMMUNICATION SYSTEM

(75) Inventor: Carol Katz, Longwood, FL (US)

(73) Assignee: Cingular Wireless II, LLC, Atlanta, GA (US)

( * ) Notice: Subject to any disclaimer, the term of this patent is extended or adjusted under 35 U.S.C. 154(b) by 559 days.

(21) Appl. No.: 10/328,562

(22) Filed: Dec. 23, 2002

(65) Prior Publication Data

US 2004/0203440 A1 Oct. 14, 2004

(51) Int. Cl.
*H04B 17/00* (2006.01)
(52) U.S. Cl. .................. 455/67.11; 455/423; 379/1.01
(58) Field of Classification Search ............ 455/67.11, 455/423–425; 379/22.03, 29.07, 29.08, 15.05
See application file for complete search history.

(56) References Cited

U.S. PATENT DOCUMENTS

| | | | | |
|---|---|---|---|---|
| 5,473,596 A | * | 12/1995 | Garafola et al. | ............ 370/241 |
| 5,771,274 A | * | 6/1998 | Harris | ............ 379/22.03 |
| 6,567,657 B1 | * | 5/2003 | Holly et al. | ............ 455/408 |
| 6,785,541 B2 | * | 8/2004 | Martin | ............ 455/423 |
| 6,928,147 B2 | * | 8/2005 | Gonsalves et al. | ....... 379/32.01 |

FOREIGN PATENT DOCUMENTS

JP          200171516 A  *  6/2000

* cited by examiner

*Primary Examiner*—Matthew D. Anderson
*Assistant Examiner*—Angelica M. Perez
(74) *Attorney, Agent, or Firm*—Gardner Groff Santos & Greenwald PC

(57) ABSTRACT

Tracking a network problem in a wireless telecommunication system may include creating an outage record in an outage database after the network problem is detected, the outage record corresponding to the network problem and updating the outage record if the network problem is repaired. Furthermore, tracking a network problem in a wireless telecommunication system may also include using the outage database in operating the wireless telecommunication system.

16 Claims, 5 Drawing Sheets

TRACKING NETWORK PROBLEMS IN A WIRELESS TELECOMMUNICATION SYSTEM

DESCRIPTION OF THE INVENTION

1. Field of the Invention

The invention relates generally to systems and methods for tracking network problems in a wireless telecommunication system, and more particularly, to systems and methods for providing tracking network problems in a wireless telecommunication system using an outage database.

2. Background of the Invention

The use of telephone products and systems in the day-to-day lives of most people is continually growing. With the advent and steady growth of wireless telecommunications, wireless telecommunication systems will increasingly be utilized for not only voice data, but also for sending and receiving packetized data for use on the Internet, for example. In an effort to lower operating costs and increase value for its subscribers, wireless telecommunication providers wish to track network problems in the wireless telecommunication system. Wireless telecommunication system providers may attract new subscribers to the wireless telecommunication system or may tend to retain current subscribers by tracking and resolving network problems. Thus, wireless telecommunication system providers may realize a competitive advantage by tracking and solving network problems.

Therefore, the need to efficiently track a network problem in a wireless telecommunication system has become a common need for many wireless telecommunication providers. More specifically, tracking network problems in a wireless telecommunication system using an outage database has become a critical service for many wireless telecommunication providers. This is because in an increasingly competitive environment, meeting and exceeding the expectations of subscribers or others who receive services is essential for a wireless telecommunication provider.

One solution to the tracking problem, for example, is to create a ticket in an outage reporting system, which will enable administrators to monitor the progression of the down network item. Using this method, the network operations center (NOC) is able to retrieve and fix network problems from a central location, thereby providing a method to quickly fix and resolve problems within the network.

Thus, there remains a need to efficiently track a network problem in a wireless telecommunication system. In addition, there remains a need for tracking network problems in a wireless telecommunication system using an outage database.

SUMMARY OF THE INVENTION

Consistent with the present invention, methods and systems for tracking network problems in a wireless telecommunication system are provided that avoid problems associated with prior methods and systems for tracking network problems in a wireless telecommunication system as discussed herein above.

In one aspect, a method for tracking a network problem in a wireless telecommunication system comprises creating an outage record in an outage database after the network problem is detected, the outage record corresponding to the network problem, updating the outage record if the network problem is repaired, and using the outage database in operating the wireless telecommunication system.

In another aspect, a system for tracking a network problem in a wireless telecommunication system comprises a component for creating an outage record in an outage database after the network problem is detected, the outage record corresponding to the network problem, a component for updating the outage record if the network problem is repaired, and a component for using the outage database in operating the wireless telecommunication system.

In yet another aspect, a computer-readable medium on which is stored a set of instructions for tracking a network problem in a wireless telecommunication system, which when executed perform stages comprising creating an outage record in an outage database after the network problem is detected, the outage record corresponding to the network problem, updating the outage record if the network problem is repaired, and using the outage database in operating the wireless telecommunication system.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DESCRIPTION OF THE EMBODIMENTS

Figure 1:
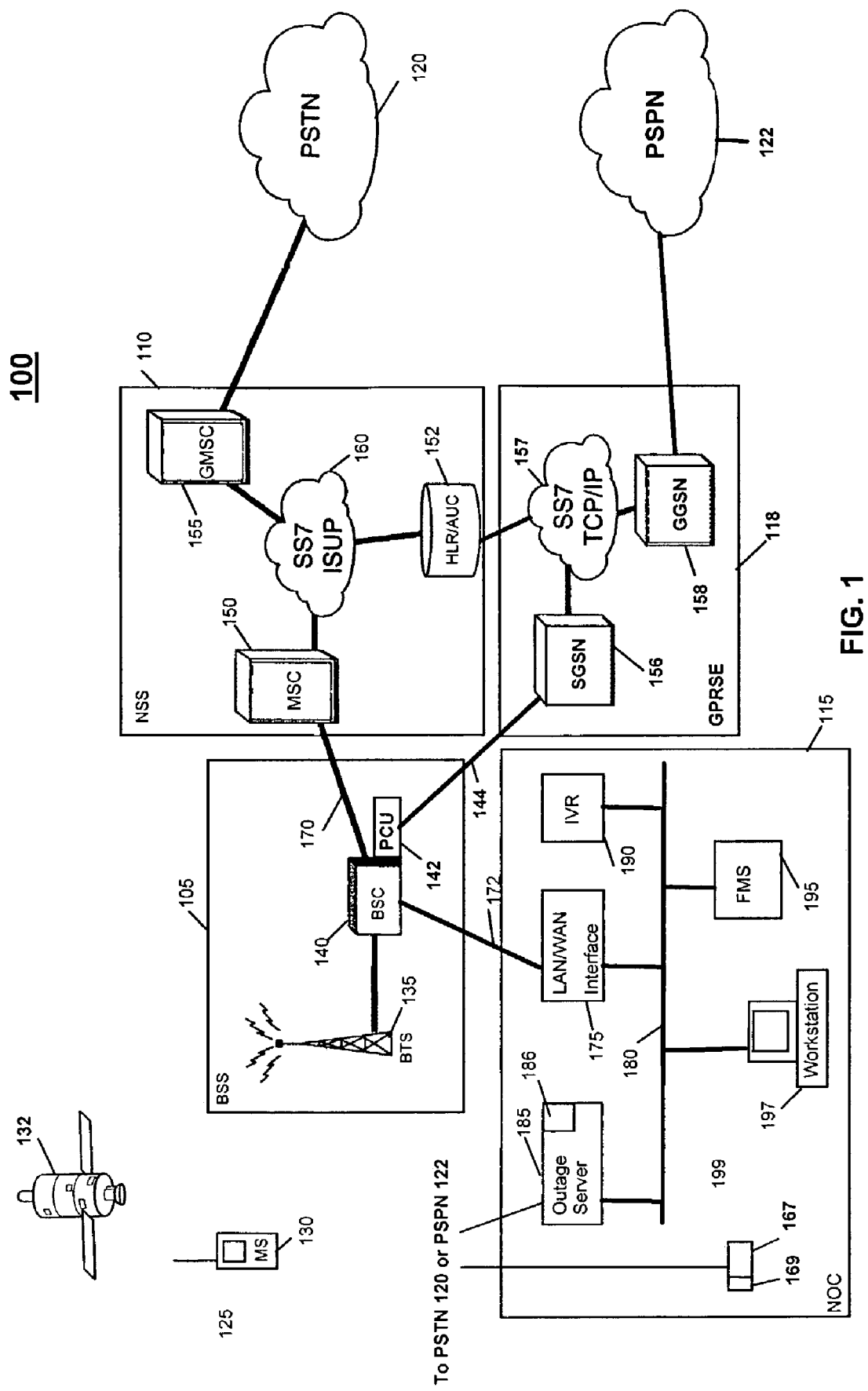
FIG. 1 is a functional block diagram of an exemplary system for tracking network problems in a wireless telecommunication system consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with the general principles of the present invention, a system for tracking a network problem in a wireless telecommunication system comprises a component for creating an outage record in an outage database after the network problem is detected, the outage record corresponding to the network problem, a component for updating the outage record if the network problem is repaired, and a component for using the outage database in operating the wireless telecommunication system.

As herein embodied and illustrated in FIG. 1, a wireless telecommunication system 100 may comprise a base station subsystem (BSS) 105, a network and switching subsystem (NSS) 110, a network operation center (NOC) 115, a general packet radio service element (GPRSE) 118, a mobile station (MS) 130, a publicly switched telephone network (PSTN) 120, and a publicly switched packet network (PSPN) 122. The elements of system 100 will be described in greater detail below. Consistent with an embodiment of the invention, the component for creating an outage record, the component for updating the outage record, and the component for using the outage database may comprise an outage server 185 or a fault management system 195. Those of ordinary skill in the art, however, will appreciate that other elements of system 100 may comprise the component for creating an outage record, the component for updating the outage record, and the component for using the outage database.

System 100 may utilize GSM technology enhanced with GPRS in embodiments of the present invention. Those of ordinary skill in the art will appreciate, however, that other wireless telecommunication technologies standards may be employed, for example, FDMA, TDMA, CDMA, UMTS, EDGE and CDMA2000, without departing from the spirit of the invention.

Wireless telecommunications may include radio transmission via the airwaves, however, those of ordinary skill in the art will appreciate that various other telecommunication techniques can be used to provide wireless transmission including infrared line of sight, cellular, microwave, satellite, blue-tooth, packet radio, and spread spectrum radio. Wireless data may include, but is not limited to, paging, text messaging, e-mail, Internet access, instant messaging, and other specialized data applications specifically excluding or including voice transmission.

As shown in FIG. 1, BSS 105 may comprise, for example, a base transceiver station (BTS) 135, a base station controller (BSC) 140, and a packet control unit (PCU) 142. BSS 105 connects to MS 130 through a radio interface and connects to NSS 110 through an interface 170. BSC 140 controls BTS 135 and may control a plurality of other base transceiver stations in addition to BTS 135. BTS 135 may comprise radio transmission and reception equipment located at an antenna site. Associated with BSS 105, a transcoder/rate adaptation unit (TRAU) (not shown) may perform speech encoding and speech decoding and rate adaptation for transmitting data. As a subpart of BTS 135, the TRAU may be located away from BTS 135, for example, at a mobile switching center located in NSS 110. When the TRAU is located in this way, the low transmission rate of speech code channels allows more compressed transmission between BTS 135 and the TRAU.

PCU 142 connects BSS 105 to GPRSE 118, which allows, for example, the Internet to link with MS 130. PCU 142 adds level 2 functions of GPRS such as data aware radio link control (RLC) and the MAC protocol layer as well as performing radio resource configuration and channel assignment. Interface 170 between NSS 110 and BSS 105, and a wide area network 172 between BSC 140 and NOC 115, may comprise T-1 lines using X.25 or TCP/IP protocol, for example.

MS 130 may comprise a mobile phone, a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. MS 130 may utilize cellular telephone protocols such as wireless application protocol (WAP). Those of ordinary skill in the art will recognize that other systems and components may be utilized within the scope and spirit of the invention.

Furthermore, MS 130 may be configured to utilize the Global Positioning System (GPS). GPS is a system of 24 satellites for identifying earth locations created by the U.S. Department of Defense. By triangulation of signals from three of the satellites in the GPS, which may include satellite 132, a receiving unit, MS 130 for example, can pinpoint its current location anywhere on earth to within a small margin of error. By using GPS, MS 130 may periodically calculate its geographic location and send its geographic location periodically to server 185 or user device 167, either through NSS 110 and PSTN 120 or through GPRSE 118 and PSPN 122. Those of ordinary skill in the art will appreciate that there are many other way to send geographic location data from MS 130 to server 185, including, for example, a direct connection from BSS 105, NSS 110, or GPRSE 118 to server 185. In addition, those of ordinary skill in the art will appreciate that there are way other than using GPS to obtain geographic data.

Still referring to FIG. 1, NSS 110 may comprise a mobile switching center (MSC) 150, a home location register/authentication center (HLR/AUC) 152, a gateway mobile switching: center (GMSC) 155, and a first network 160. NSS 110 manages the communication between subscribers, for example, a second system operator 125 using MS 130, and other telecommunications users, for example, a first system operator 199, using, for example, publicly switched telephone network (PSTN) 120. PSTN 120 may comprise, for example, the worldwide voice telephone network.

MSC 150 coordinates call set-up to and from subscribers such as operator 125 using MS 130. MSC 150 may control several base station controllers such as, and similar to BSC 140. GMSC 110 is used to interface with external networks for communication with users outside of the wireless system, such users on PSTN 120.

HLR/AUC 152 may comprise a stand-alone computer without switching capabilities, a database which contains subscriber information, and information related to the subscriber's current location, but not the actual location of the subscriber. The AUC portion of HLR/AUC 152 manages the security data for subscriber authentication. Another subdivision of HLR/AUC 152 may include an equipment identity register (EIR) (not shown) which may store data relating to mobile equipment (ME).

NSS 110 may also include a visitor location register (VLR) (not shown). The VLR links to one or more mobile switching center located on other systems, temporarily storing subscription data of subscribers currently served by MSC 150. The VLR holds more detailed data than HLR/AUC 152. For example, the VLR may hold more current subscriber location information than the location information at HLR/AUC 152.

GMSC 155 is utilized to interface with PSTN 120. In order to set up a requested call, the call is initially routed to GMSC 155 that finds the correct home location register by knowing the director number of the subscriber. GMSC 155 has an interface with an external network, such as PSTN 120, for gatewaying communications.

The elements of NSS 110 are connected using first network 160. First network 160 may comprise an intelligent network utilizing signal system 7 (SS7) in an ISDN user part (ISUP) protocol. ISUP is used for both ISDN and non-ISDN calls. Calls that originate and terminate at the same switch do not use ISUP signaling.

As shown in FIG. 1, GPRSE 118 may comprise a serving GPRS service node (SGSN) 156, a second network 157, and a gateway GPRS service node (GGSN) 158. In order to implement GPRS, two new node types may be added to a conventional GSM network, GGSN 158 and SGSN 156. Also, the interfaces to the conventional GSM system may be augmented and an extra unit, such as PCU 142 that may be located in BSS 105 as described above, may be added.

SGSN 156 connects GPRSE 118 to BSS 105 through interface 144, which may comprise T-1 lines using X.25 or TCP/IP protocol, for example. SGSN 156 receives the traffic from mobile subscribers associated with BSS 105 and forwards the traffic to GGSN 158. SGSN 156 uses its links with HLR/AUC 152 to authenticate and bill subscribers, and may provide additional services such as data compression, session management and encryption.

GGSN 158 acts as a gateway to PSPN 122, which is most often a publicly switched packet network such as the Internet. Data is sent across the GPRS network to GGSN 158, un-encapsulated, and then forwarded to the next node. To the outside world GGSN 158 may appear as just another router on the Internet. Common features of GGSN 158 may include firewall/packet-filtering technologies and a dynamic host configuration protocol (DHCP) server to configure IP options of MS 130 as it logs onto the network. DHCP automatically assigns IP addresses to client stations logging onto a TCP/IP network. It eliminates having to manually assign permanent IP addresses. DHCP software typically runs in servers and is found in network devices such as ISDN routers and modem routers that allow multiple users access to the Internet.

SGSN 156 and GGSN 158 are connected through second network 157. Second network 157 may employ SS7 as described above and use transmission control protocol/ Internet protocol (TCP/IP).

Still referring to FIG. 1, network operation center (NOC) 115 may comprise a user device 167, a LAN/WAN interface 175, a local area network (LAN) 180, server 185, an outage database 186, an interactive voice response system (IVR) 190, fault management system (FMS) 195, a workstation 197, and first system operator 199.

User device 167 may comprise a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information as known by those of ordinary skill in the art. User device 167 may comprise a communication unit 169 capable of providing voice or data communications between communication unit 169 and MS 130. For example, communication unit 169 may include a radio, a cellular telephone, a wire line telephone, a hand-held computing device, microprocessor-based or programmable consumer electronic device, a personal digital assistant (PDA), a facsimile machine, a pager, or a portable computer. Those of ordinary skill in the art will appreciate that may other types of devices may comprise communication unit 169.

LAN/WAN interface 175 interfaces WAN 172 and LAN 180, thus connecting the elements connected to LAN 180 with BSC 140. Also connected to LAN 180 is server 185. Server 185 may comprise a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information as known by those of ordinary skill in the art. Analysis database 186 may be located on storage media in server 185 or other storage media in systems, servers, or components accessible by server 185.

PSPN 122, most often a publicly switched packet network such as the Internet, may be accessed by first system operator 199 or second system operator 125 through user device 167 or MS 130 respectively in a conventional manner as is known by those of ordinary skill in the art. Likewise, PSTN 120 be accessed by first system operator 199 or second system operator 125 through user device 167 or MS 130 respectively in a conventional manner as is known by those of ordinary skill in the art.

FMS 195 is a device used to detect, diagnose, and correct problems on system 100 effecting the security or reliability of system 100. Like server 185, FMS 195 may comprise a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. Workstation 197 allows first system operator 199 to interface with server 185, IVR 190, or FMS 195. Workstation 197 may comprise, for example, a scalable performance architecture (SPARC) station marketed by Sun Microsystems, Inc. of 901 San Antonio Road Palo Alto, Calif. 94303-4900. SPARC is a family of 32-bit RISC CPUs developed by Sun Microsystems, Inc.

Figure 2:
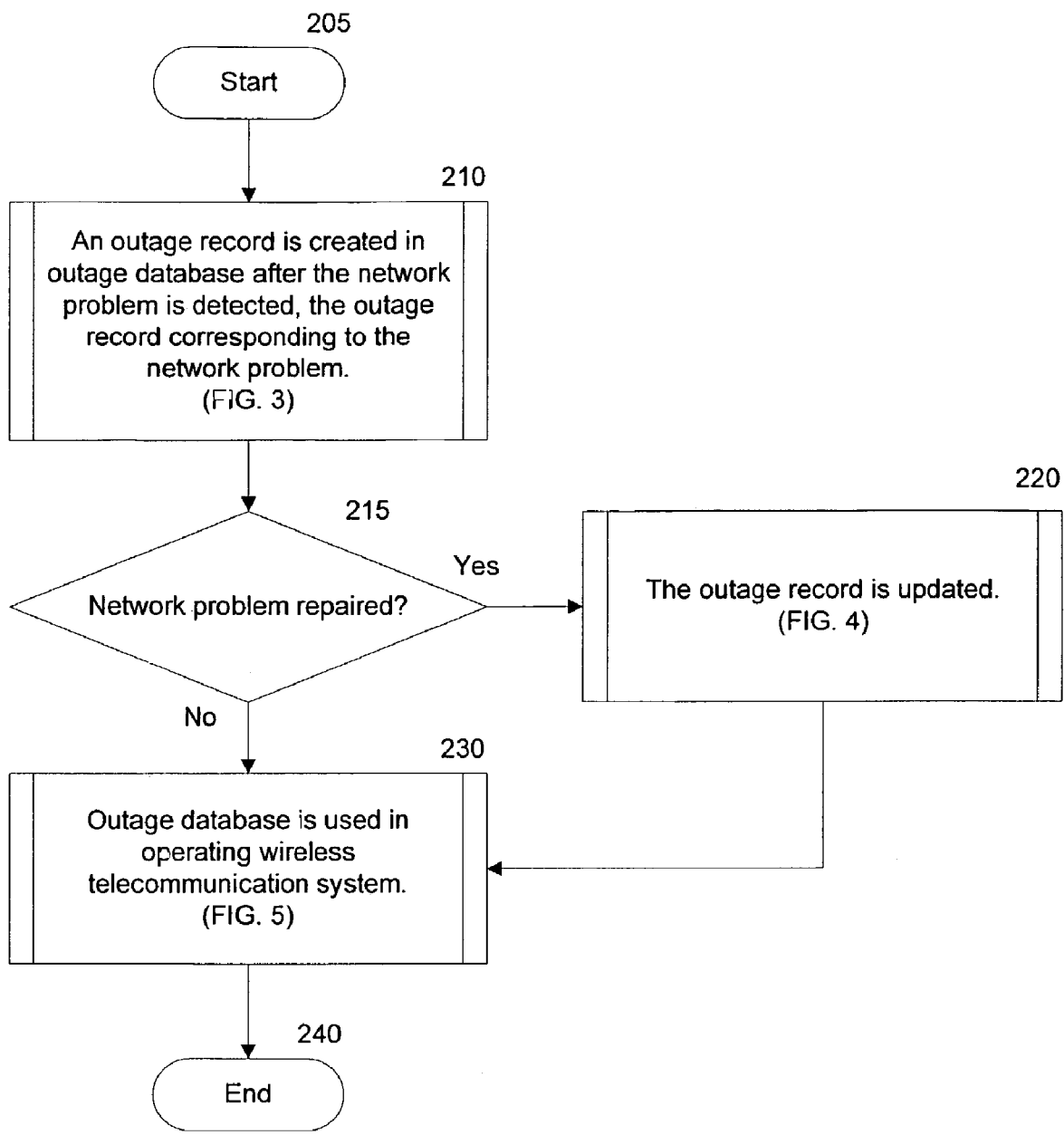
FIG. 2 is a flow chart of an exemplary method for tracking network problems in a wireless telecommunication system consistent with an embodiment of the present invention.
Figure 3:
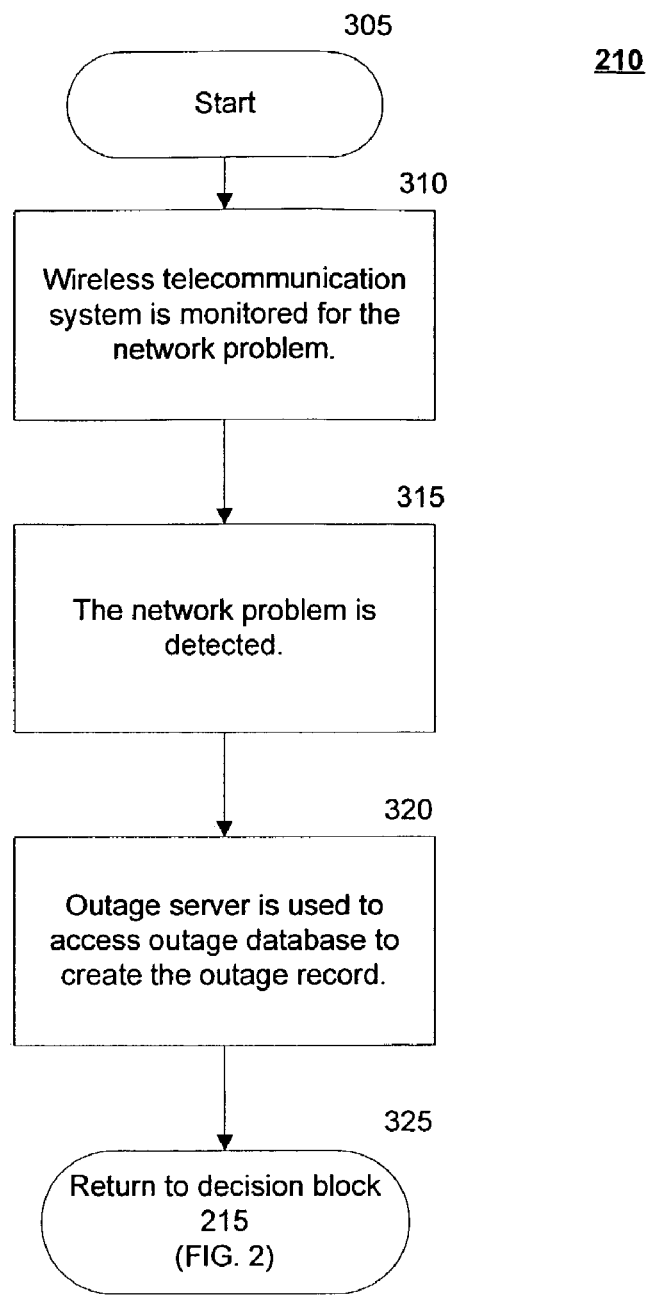
FIG. 3 is a flow chart of an exemplary subroutine used in the exemplary method of FIG. 2 for creating an outage record in an outage database after the network problem is detected consistent with an embodiment of the present invention.

FIG. 2 is a flow chart setting forth the general stages involved in an exemplary method for tracking a network problem in a wireless telecommunication system consistent with an embodiment of the present invention. The implementation of the stages of exemplary method 200 in accordance with an exemplary embodiment of the present invention will be described in greater detail in FIG. 3 through FIG. 5. Exemplary method 200 begins at starting block 205 and proceeds to exemplary subroutine 210 where an outage record is created in outage database 186 after the network problem is detected, the outage record corresponding to the network problem. The stages of exemplary subroutine 210 are shown in FIG. 3 and will be described in detail below.

From exemplary subroutine 210 where the outage record is created in outage database 186 after the network problem is detected, exemplary method 200 continues to decision block 215 where it is determined if the network problem has been repaired.

Figure 4:
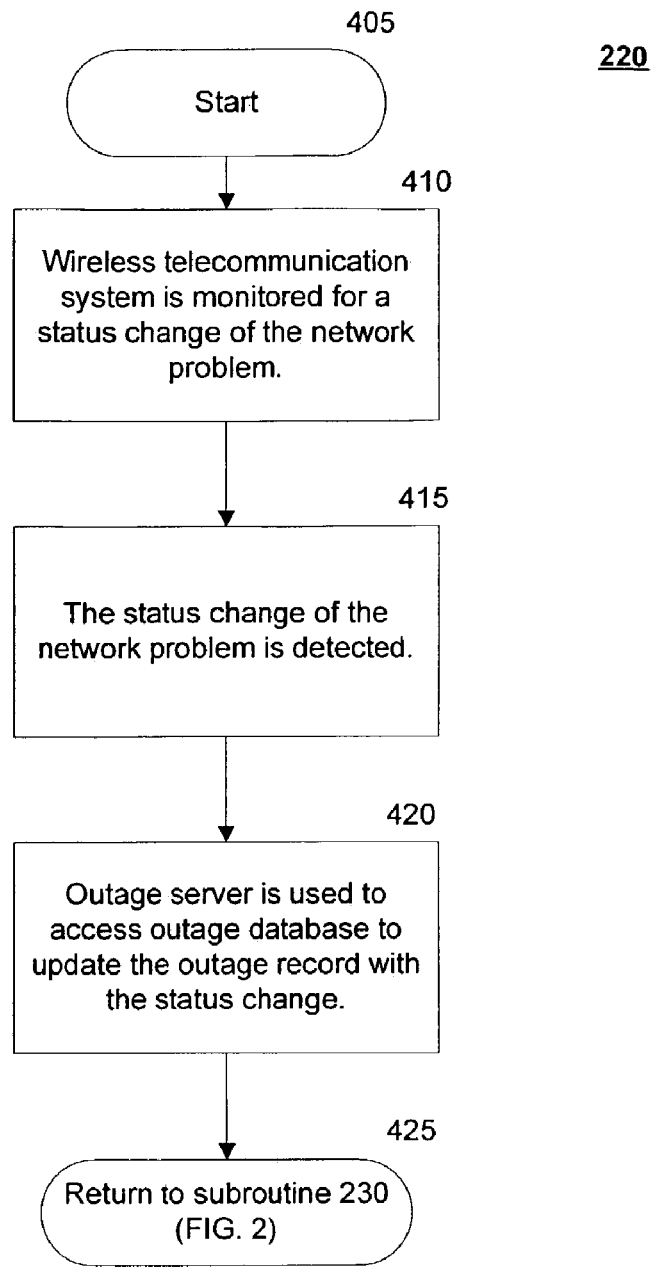
FIG. 4 is a flow chart of an exemplary subroutine used in the exemplary method of FIG. 2 for updating the outage record if the network problem is repaired consistent with an embodiment of the present invention.

If at decision block 215 it is determined that the network problem has been repaired, exemplary method 200 continues to exemplary subroutine 220 where the outage record is updated. The stages of exemplary subroutine 220 are shown in FIG. 4 and will be described in detail below.

Figure 5:
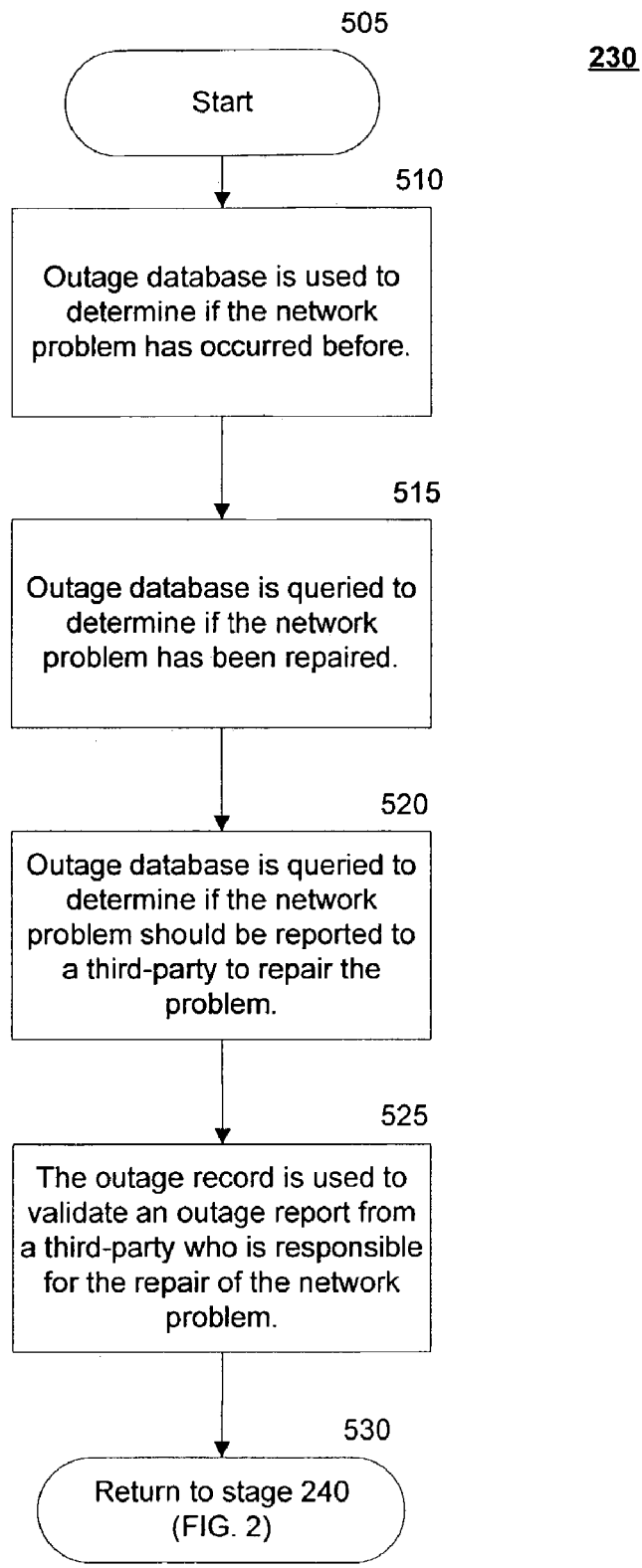
FIG. 5 is a flow chart of an exemplary subroutine used in the exemplary method of FIG. 2 for using the outage database in operating the wireless telecommunication system consistent with an embodiment of the present invention.

If at decision block 215 it is determined that the network problem has not been repaired or from subroutine 220 where the outage record is updated, exemplary method 200 continues to exemplary subroutine 230 where outage database 186 is used in operating wireless telecommunication system 100. The stages of exemplary subroutine 230 are shown in FIG. 5 and will be described in detail below.

Once outage database 186 is used in operating wireless telecommunication system 100 in exemplary subroutine 230, exemplary method 200 ends at stage 240.

FIG. 3 describes exemplary subroutine 210 from FIG. 2 for creating the outage record in outage database 186 after the network problem is detected, the outage record corresponding to the network problem. Exemplary subroutine 210 begins at starting block 305 and advances to stage 310 where wireless telecommunication system 100 is monitored for the network problem. After wireless telecommunication system 100 is monitored for the network problem in stage 310, exemplary subroutine 210 continues to stage 315 where the network problem is detected. Once the network problem is detected in stage 315, exemplary subroutine 210 advances to stage 320 where outage server 185 is used to access outage database 186 to create the outage record.

After outage server 185 is used to access outage database 186 to create the outage record in stage 320, exemplary subroutine 210 continues to stage 330 and returns to decision block 215 of FIG. 2.

FIG. 4 describes exemplary subroutine 220 from FIG. 2 for updating the outage record if the network problem is repaired. Exemplary subroutine 220 begins at starting block 405 and advances to stage 410 where wireless telecommunication system 100 is monitored for a status change of the network problem.

After wireless telecommunication system 100 is monitored for a status change of the network problem in stage 410, exemplary subroutine 220 continues to stage 415 where the status change of the network problem is detected.

Once the status change of the network problem is detected in stage 415, exemplary subroutine 220 advances to stage 420 where outage server 185 is used to access outage database 186 to update the outage record with the status change.

After outage server 185 is used to access outage database 186 to update the outage record with the status change in stage 420, exemplary subroutine 220 continues to stage 425 where and returns to exemplary subroutine 230 of FIG. 2.

FIG. 5 describes exemplary subroutine 230 from FIG. 2 for using outage database 186 in operating wireless telecommunication system 100. Exemplary subroutine 230 begins at starting block 505 and advances to stage 510 where outage database 186 is used to determine if the network problem has occurred before.

After outage database 186 is used to determine if the network problem has occurred before in stage 510, exemplary subroutine 230 continues to stage 515 where outage database 186 is queried to determine if the network problem has been repaired.

Once outage database 186 is queried to determine if the network problem has been repaired in stage 515, exemplary subroutine 230 advances to stage 520 where outage database 186 is queried to determine if the network problem should be reported to a third-party to repair the problem.

After outage database 186 is queried to determine if the network problem should be reported to a third-party to repair the problem in stage 520, exemplary subroutine 230 continues to stage 525 where the outage record is used to validate an outage report from a third-party who is responsible for the repair of the network problem.

From stage 525 where the outage record is used to validate an outage report from a third-party who is responsible for the repair of the network problem, exemplary subroutine 230 advances to stage 530 and returns to stage 240 of FIG. 2.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for operating a wireless telecommunication system in order to minimize network outages, comprising:
   detecting a network problem;
   determining a geographic location of the network problem using a Global Positioning System (GPS);
   creating an outage record in an outage database after a network problem is detected, the outage record corresponding to the network problem and identifying the geographic location of the network problem;
   updating the outage record if the network problem is repaired; and
   using the outage database in operating the wireless telecommunication system, including querying the outage database to determine if the network problem has been repaired and including using the outage database to determine if the network problem has occurred before and thus whether the network problem is recurring and thereby to track and solve network problems so as to minimize network outages, whereby the database is used to determine how to operate the wireless telecommunication system to address recurring problems.

2. The method of claim 1, wherein creating the outage record further comprises:
   monitoring the wireless telecommunication system for the network problem;
   detecting the network problem; and
   using an outage server to access the outage database to create the outage record.

3. The method of claim 2, wherein detecting the network problem further comprises using a Fault Management System (FMS) in communication with the wireless telecommunication system to at least one of locate and identify the network problem.

4. The method of claim 1, wherein updating the outage record further comprises:
   monitoring the wireless telecommunication system for a status change of the network problem;
   detecting the status change of the network problem; and
   using the outage server to access the outage database to update the outage record with the status change.

5. The method of claim 1, wherein using the outage database further comprises querying the outage database to determine if the network problem should be reported to a third-party to repair the problem.

6. The method of claim 1, wherein the using the outage database further comprises using the outage record to validate an outage report from a third-party who is responsible for the repair of the network problem.

7. The method of claim 6, wherein a monetary penalty to be paid by the third-party to the operator of the wireless telecommunication system is calculated based upon the validation.

8. The method of claim 1, wherein the outage record comprises at least one of a circuit ID associated with the network problem, time the network problem occurred, who reported the network problem, where the network problem occurred, the duration of the network problem, and a third-party responsible for the repair of the network problem.

9. A system for operating a wireless telecommunication system in order to minimize network outages, comprising:
- a component for detecting a network problem;
- a component for using a Global Positioning System (GPS) to determine a geographic location of the network problem;
- a component for creating an outage record in an outage database after a network problem is detected, the outage record corresponding to the network problem and identifying the geographic location of the network problem;
- a component for updating the outage record if the network problem is repaired; and
- a component for using the outage database in operating the wireless telecommunication system, including querying the outage database to determine if the network problem has been repaired and including using the outage database to determine if the network problem has occurred before and thus whether the network problem is recurring and thereby to track and solve network problems so as to minimize network outages, whereby the database is used to determine how to operate the wireless telecommunication system to address recurring problems.

10. The system of claim 9, wherein the component for creating the outage record is further configured for:
- monitoring the wireless telecommunication system for the network problem;
- detecting the network problem; and
- using an outage server to access the outage database to create the outage record.

11. The system of claim 10, wherein detecting the network problem further comprises using a Fault Management System (FMS) in communication with the wireless telecommunication system to at least one of locate and identify the network problem.

12. The system of claim 9, wherein the component for updating the outage record is further configured for:
- monitoring the wireless telecommunication system for a status change of the network problem;
- detecting the status change of the network problem; and
- using the outage server to access the outage database to update the outage record with the status change.

13. The system of claim 9, wherein the component for using the outage database is further configured for querying the outage database to determine if the network problem should be reported to a third-party to repair the problem.

14. The system of claim 9, wherein the component for using the outage database is further configured for using the outage record to validate an outage report from a third-party who is responsible for the repair of the network problem.

15. The system of claim 14, wherein a monetary penalty to be paid by the third-party to the operator of the wireless telecommunication system is calculated based upon the validation.

16. The system of claim 9, wherein the outage record comprises at least one of a circuit ID associated with the network problem, time the network problem occurred, who reported the network problem, where the network problem occurred, the duration of the network problem, and a third-party responsible for the repair of the network problem.

* * * * *